(12) United States Patent   (10) Patent No.: US 12,591,130 B2
Liu et al.   (45) Date of Patent: Mar. 31, 2026

(54) COMBINATION OF DLC AND PFPE FOR EWOD ACTUATION

(71) Applicant: Seagate Technology LLC, Fremont, CA (US)

(72) Inventors: Xiong Liu, Singapore (SG); Barish Chakravarty, Singapore (SG); Lihong Zhang, Singapore (SG); Akhil Namboori, Singapore (SG); Hui Ning Tan, Singapore (SG)

(73) Assignee: Seagate Technology LLC, Fremont, CA (US)

( * ) Notice: Subject to any disclaimer, the term of this patent is extended or adjusted under 35 U.S.C. 154(b) by 838 days.

(21) Appl. No.: 17/859,408

(22) Filed: Jul. 7, 2022

(65) Prior Publication Data

US 2023/0066792 A1   Mar. 2, 2023

Related U.S. Application Data

(60) Provisional application No. 63/238,331, filed on Aug. 30, 2021.

(51) Int. Cl.
G02B 26/00 (2006.01)

(52) U.S. Cl.
CPC .................................. G02B 26/005 (2013.01)

(58) Field of Classification Search
CPC ......... B01L 3/502707; B01L 3/502792; B01L 3/5027; B01L 3/502784; B01L 2200/0673; B01L 2200/0645; B01L 2200/0816; B01L 2200/16; B01L 2400/0427
See application file for complete search history.

(56) References Cited

U.S. PATENT DOCUMENTS

| | | | |
|---|---|---|---|
| 9,202,500 B2 | 12/2015 | Kunkel et al. | |
| 10,413,912 B2 | 9/2019 | Gascoyne et al. | |
| 11,087,790 B2 | 8/2021 | Ramakrishnan | |
| 11,235,325 B2 | 2/2022 | Roberts et al. | |
| 2009/0216104 A1* | 8/2009 | DeSimone | A61L 29/085 |
| | | | 606/76 |
| 2019/0314820 A1 | 10/2019 | Geng et al. | |
| 2020/0101456 A1 | 4/2020 | Watkins et al. | |
| 2020/0147548 A1 | 5/2020 | van Dam et al. | |
| 2021/0138457 A1 | 5/2021 | Roberts et al. | |

(Continued)

FOREIGN PATENT DOCUMENTS

| | | |
|---|---|---|
| FR | 3058328 A1 | 5/2018 |
| TW | 202200268 A | 1/2022 |

(Continued)

OTHER PUBLICATIONS

Gascoyne et al. Lab Chip, 2004, 4, 299-309 (Year: 2004).*

(Continued)

*Primary Examiner* — Gurpreet Kaur

(74) *Attorney, Agent, or Firm* — Westman, Champlin & Koehler, P.A.

(57)   ABSTRACT

A digital microfluidic (DMF) system based on an electrowetting-on-dielectric mechanism includes a substrate, and at least one dielectric layer comprising diamond-like carbon over the substrate. The DMF system also includes a plurality of electrodes connected to the dielectric layer. A voltage source is selectively couplable to different electrodes of the plurality of electrodes.

19 Claims, 2 Drawing Sheets

(56) References Cited

U.S. PATENT DOCUMENTS

| | | | |
|---|---|---|---|
| 2021/0149184 A1 | 5/2021 | Zhitomirsky | |
| 2021/0170413 A1 | 6/2021 | Zhitomirsky et al. | |
| 2021/0256919 A1 | 8/2021 | French | |
| 2021/0256920 A1 | 8/2021 | Bishop et al. | |
| 2025/0018395 A1* | 1/2025 | Visani .................... | G09G 3/348 |

FOREIGN PATENT DOCUMENTS

| | | |
|---|---|---|
| WO | 2018093794 A2 | 5/2018 |
| WO | 2021094362 A1 | 5/2021 |
| WO | 2021102134 A1 | 5/2021 |
| WO | 2021161048 A1 | 8/2021 |

OTHER PUBLICATIONS

Zichuan Yi, Haoqiang Feng, Xiaofeng Zhou and Lingling Shui, "Design of an Open Electrowetting on Dielectric Device Based on Printed Circuit Board by Using a Parafilm M", Frontiers in Physics, vol. 8, A193, 2020.

Hong Liu, Saman Dharmatilleke, Devendra K. Maurya and Andrew A. O. Tay, "Dielectric materials for electrowetting-on-dielectric actuation", Microsyst Technol, 16:449-460, 2010.

Ilju Moon, Joonwon Kim, "Using EWOD (electrowetting-on-dielectric) actuation in a micro conveyor system", Sensors and Actuators, A130-131, pp. 537-544, 2006.

Xiaoding Ma, Jing Gui, Kevin J. Grannen, Laura A. Smoliar, Bruno Marchon, Myung S. Jhon and Charles L. Bauer, "Spreading of PFPE lubricants on carbon surfaces: effect of hydrogen and nitrogen content", Tribology Letters 6, pp. 9-14, 1999.

Matej Jane, "Electrical and Tribological Properties of DLC Coatings", Department of Mechanical Engineering, University of Coimbra, Jul. 2015.

* cited by examiner

COMBINATION OF DLC AND PFPE FOR EWOD ACTUATION

CROSS REFERENCE TO RELATED APPLICATIONS

This application claims the benefit of U.S. provisional application 63/238,331 filed on Aug. 30, 2021, the content of which is hereby incorporated in its entirety.

SUMMARY

In one embodiment, a digital microfluidic (DMF) system based on an electrowetting-on-dielectric mechanism is provided. The DMF system includes a substrate, and at least one dielectric layer comprising diamond-like carbon over the substrate. The DMF system also includes a plurality of electrodes connected to the dielectric layer. A voltage source is selectively couplable to different electrodes of the plurality of electrodes.

In another embodiment, a method is provided. The method includes forming a substrate, and forming at least one dielectric layer comprising diamond-like carbon (DLC) over the substrate. The method also includes connecting a plurality of electrodes to the dielectric layer. The method further includes providing a voltage source that is selectively couplable to different electrodes of the plurality of electrodes.

In yet another embodiment, a system is provided. The system includes a substrate, and at least one dielectric layer over the substrate. The system also includes a hydrophobic layer comprising perfluoropolyether over the at least one dielectric layer. The system further includes a plurality of electrodes connected to the dielectric layer. A voltage source is selectively couplable to different electrodes of the plurality of electrodes.

Other features and benefits that characterize embodiments of the disclosure will be apparent upon reading the following detailed description and review of the associated drawings.

DETAILED DESCRIPTION OF ILLUSTRATIVE EMBODIMENTS

Figure 1:
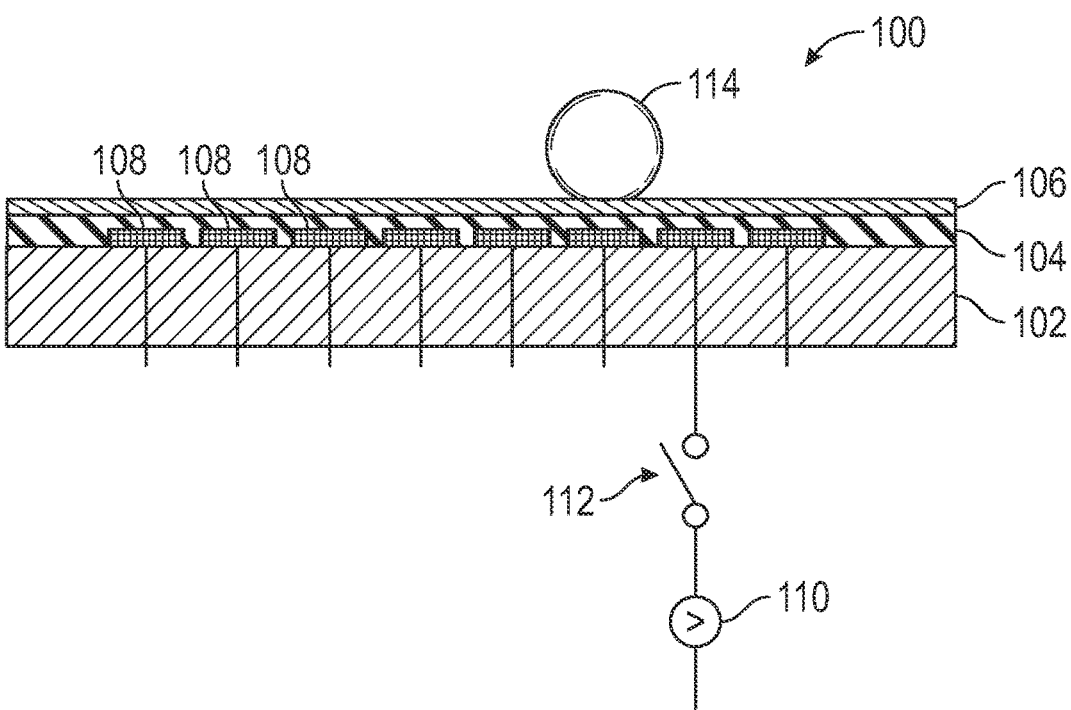
FIG. 1 is a diagrammatic illustration a digital microfluidic (DMF) system based on an electrowetting-on-dielectric (EWOD) mechanism in accordance with one embodiment.

Embodiments of the disclosure relate to digital microfluidic (DMF) systems that are based on an electrowetting-on-dielectric (EWOD) mechanism. Such DMF systems, which are useful in biomedical detection, chemical synthesis/analysis, etc., employ the EWOD mechanism for micro transportation of fluid-based micro-droplets. An example of a DMF system based on the EWOD mechanism is shown in FIG. 1, which is described further below.

It should be noted that like reference numerals may be used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

It will be understood that, when an element is referred to as being "connected," "coupled," or "attached" to another element, it can be directly connected, coupled or attached to the other element, or it can be indirectly connected, coupled, or attached to the other element where intervening or intermediate elements may be present. In contrast, if an element is referred to as being "directly connected," "directly coupled" or "directly attached" to another element, there are no intervening elements present. Drawings illustrating direct connections, couplings or attachments between elements also include embodiments, in which the elements are indirectly connected, coupled or attached to each other.

FIG. 1 is a diagrammatic illustration an example DMF system 100 based on the EWOD mechanism. System 100 includes a substrate 102, a dielectric layer 104, a hydrophobic layer 106, electrodes 108, a voltage source 110 and a switch 112. Several other elements may be part of a system such as 100, but have not been included in the drawings and description in the interest of brevity and simplification. As indicated earlier, a system such as 100 is capable of transporting a micro-droplet such as 114. In system 100, movement of micro-droplet 114 is manipulated by selective application of voltage to electrodes 108. Micro-droplet 114 may by an aqueous micro-droplet, an oil-based micro-droplet, etc. In general, micro-droplet 114 may be any fluid-based micro-droplet.

Currently, the materials and process to construct EWOD actuation to manipulate micro-droplet movement are:

- Glass for substrate 102 with a chromium (Cr)/platinum (Pt) electrode 108 array layer, or a printed circuit board assembly (PCBA) that includes electrodes 108 and its own substrate.
- $SiO_2$ for dielectric layer 104, which may be formed using vacuum deposition.
- Teflon for hydrophobic layer 106, which may be formed using spin-coating and may have a thickness between about 200 Angstroms (Å) to about 1000 Å.
- Very high voltage (e.g., about 200 Volts (V)) employed to manipulate micro-droplet movement.

The $SiO_2$/Teflon structure has a limited dielectric strength (e.g., $SiO_2$ has a dielectric strength<600 millivolts (mV)/millimeter (mm)) and the Teflon film formed by spin-coating is usually thick (e.g., 100 nanometers (nm)) and does not bond well with $SiO_2$. These factors set constraints for microdroplet movement.

As will be described below, embodiments of the disclosure replace at least some of the above-listed materials with other materials having more favorable properties, and thereby boost EWOD device performance and drop the voltage for moving micro-droplets from about 200V to <5V (e.g., a voltage from a universal serial bus (USB)). EWOD actuation principles are outlined below in connection with FIG. 2, and thereafter suitable material replacements are described.

Figure 2:
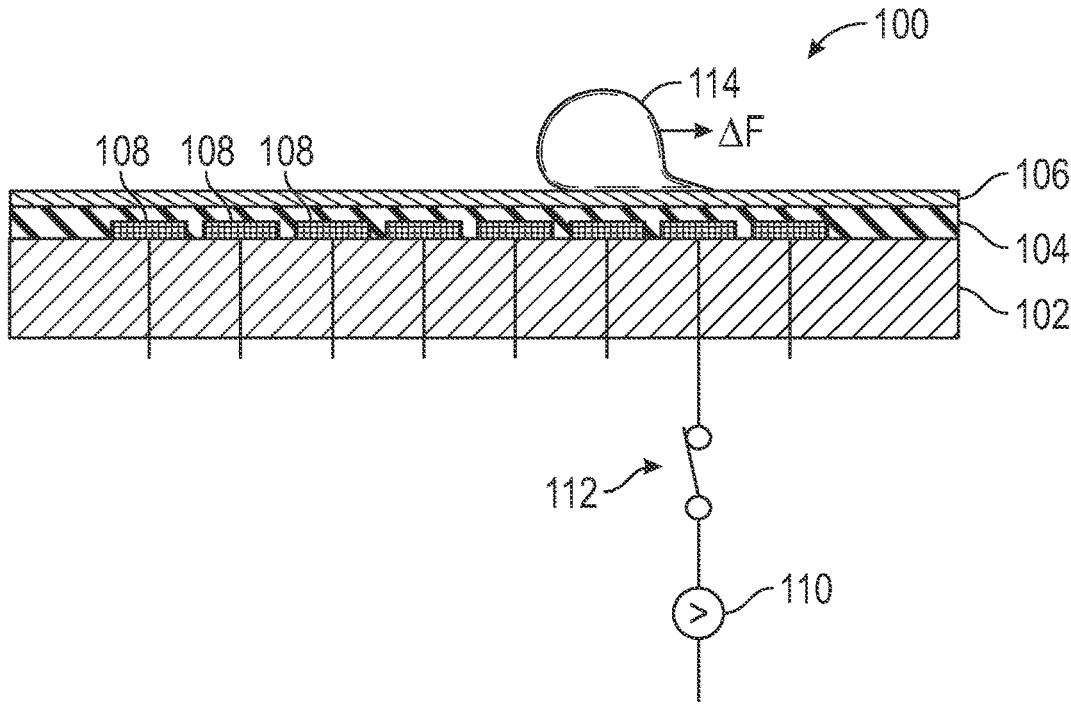
FIG. 2 is a diagrammatic illustration showing micro-droplet movement by EWOD actuation in the DMF system of FIG. 1.

FIG. 2 is a diagrammatic illustration showing microdroplet movement by EWOD actuation in a DMF system such as 100. The EWOD actuation principle is as follows: Force ΔF can be formed in the micro-droplet 114 when the voltage is applied on a particular electrode of the electrodes 108 (e.g., by closing switch 112)

$$\Delta F \propto \frac{\varepsilon}{2d}V^2 \qquad \text{Equation 1}$$

where ε is dielectric permittivity of the dielectric layer 104, d is the total thickness of the dielectric layer (e.g., $SiO_2$) 104 and the hydrophobic layer (e.g., Teflon) 106, and V is the voltage applied on the electrode 108. The micro-droplet 114 will move from one electrode of electrodes 108 over which it is currently positioned to a next electrode of electrodes 108 when ΔF is great enough to overcome friction between micro-droplet 114 and hydrophobic layer 106. In order to move the micro-droplet 114 by applying a smaller V, d may be reduced. A minimum value of d is determined by the dielectric breakdown voltage $V_b$ and the dielectric strength $E_m$:

$$d = \frac{V_b}{E_m} \qquad \text{Equation 2}$$

Therefore, a dielectric material with a high $E_m$ is suitable.

In view of the EWOD actuation principle and analysis included above, embodiments of the disclosure utilize a diamond-like-carbon (DLC) coating as the dielectric layer 104 and a perfluoropolyether (PFPE) lubricant as the hydrophobic layer 106 for the EWOD actuation. In EWOD actuation applications, such a structure can reduce the thickness of dielectric/hydrophobic layer structure, which helps boost the EWOD performance.

DLC may have a 1000V/centimeter (cm) dielectric strength, which is higher than that of $SiO_2$. Also, the dielectric strength $E_m$ of DLC can be further increased. The dielectric strength of DLC is related to the chemical bonding in the structure. A DLC film contains mainly a mixture of both sp2 and sp3 carbon-carbon interatomic bonds. The more the sp3 bonds (cross-linked diamond-like bonds), the higher the dielectric strength. Both the fabrication method and hybrid atoms contribute to higher dielectric strength. Fabrication techniques such as cathodic arc deposition, ion-beam deposition and plasma enhanced chemical vapor deposition (PECVD) may achieve higher sp3 bonding than physical sputtering. Examples of hybrid atoms that contribute to a higher dielectric strength of DLC are hydrogen and fluorine.

DLC has other advantages over $SiO_2$. A first advantage is its higher surface smoothness, which is mainly due to its dense structure including smaller C atoms. A second advantage is its ability to form bonds with the surface PFPE lubricant, which is a reason for using PFPE to replace Teflon.

PFPE films on DLC may be as thin as 9A. PFPE films can be coated on DLC using dip-coating which may be followed with a buff/wipe process to further improve the bonding and surface smoothness. With both the DLC layer and the PFPE hydrophobic layer, the overall thickness of the dielectric layer and hydrophobic layer can be reduced to about 32 Å, which is substantially thinner than the current coating method for the $SiO_2$/Teflon structure.

As noted above, the PFPE lubricants may be selected to form chemical bonds with the DLC dielectric layer. Accordingly, the PFPE lubricants may have functional end-groups that may be hydroxyl groups. Hydroxyl groups can bond with the DLC layer through hydrogen bonds. Non-limiting example of such PFPE lubricants include:

Z-tetraol series of 1000-5000 molecular weight. Z-tetraol has double —OH bonds at each end group, which can form hydrogen bonds with DLC.

X1P, which is a partially fluorinated hexaphenoxy cyclotriphosphazene.

X-1P-PFPE hybrids.

Fomblin multidentate lubricants (ZTMD). These lubricants have multiple functional bonding groups at the ends and along the chain of the lubricant molecules, so they can form strong bonds with the DLC layer.

Z-dol series of molecular weight about 1000 to 5000. Z-dol has a polar (—OH) for each end group, which can form hydrogen bonds with DLC.

In the above-described embodiment, the DLC coating 104 is shown as a single layer. However, in an alternate embodiment, the DLC coating may be multi-layered, with different individual layers having different compositions. Such an embodiment is described below in connection with FIG. 3.

Figures 3, 4:
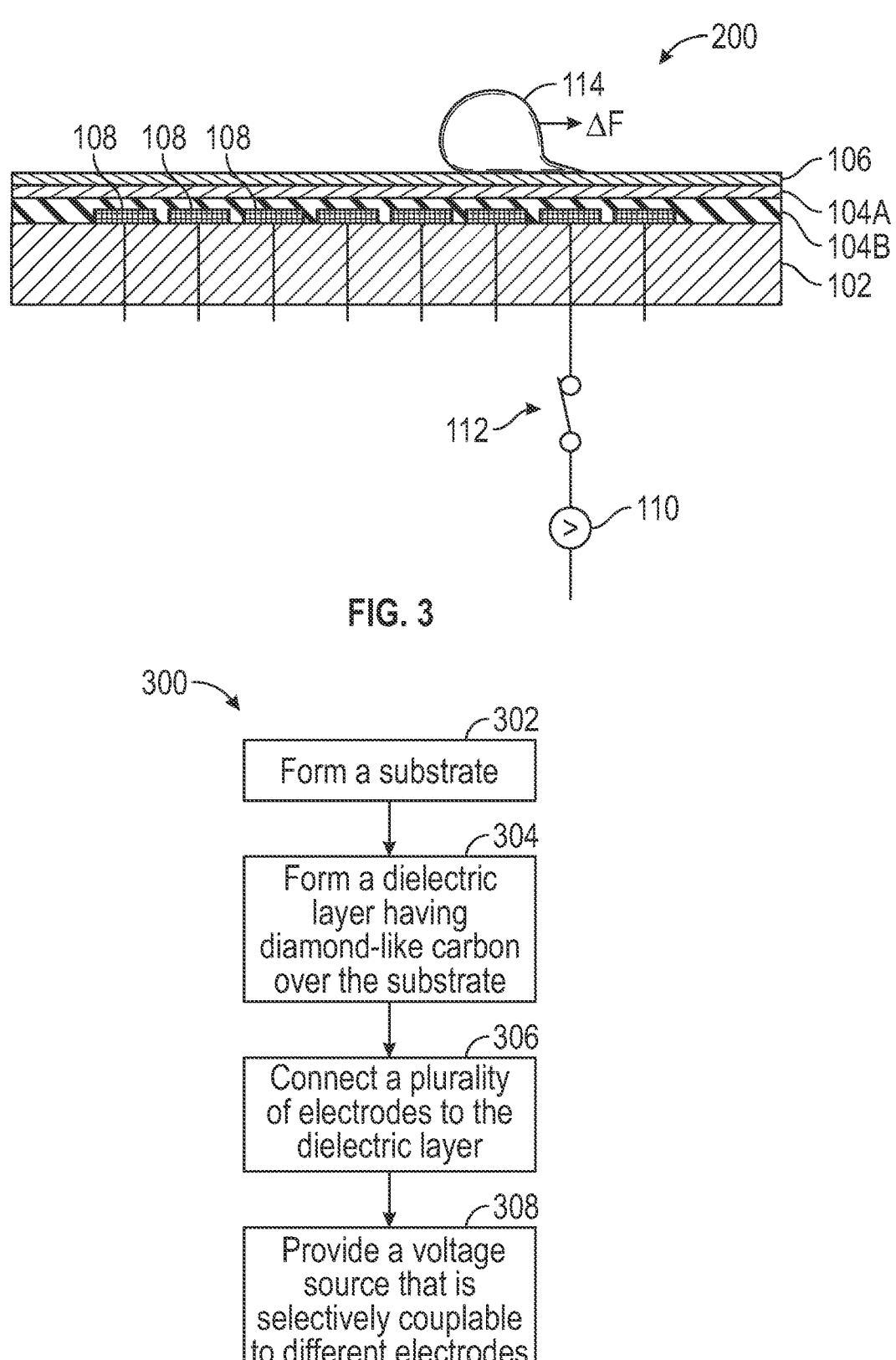
FIG. 3 is a diagrammatic illustration of a DMF system based on the EWOD mechanism in accordance with another embodiment.
FIG. 4 is a flow diagram of a method embodiment.

FIG. 3 is a diagrammatic illustration an example DMF system 200 based on the EWOD mechanism that employs a multi-layered DLC coating in accordance with one embodiment. In EWOD actuation applications, it is desirable that the DLC coating 104 bonds well with the PFPE film 106, and that the DLC coating has a high breakdown voltage. The embodiment of FIG. 3 accomplishes both these goals by employing a bi-layered DLC coating including a first DLC layer 104A and a second DLC layer 104B, with a composition of the first DLC layer 104A being different from a composition of the second DLC layer 104B. In other respects, DMF system 200 is similar to DMF system 100 of FIGS. 1 and 2. The description of the similar elements is not repeated in the interest of brevity.

As can be seen in FIG. 3, the first DLC layer 104A is above the second DLC layer 104B and is in contact with the PFPE layer 106. In one embodiment, the first DLC layer 104A is a nitrogenated DLC (N-DLC) layer. One purpose of the N-DLC layer 104A is to provide strong bonding with the PFPE film 106. Carbon-nitrogen bonds in N-DLC have active partial charge sites which provide strong bonding with PFPE molecules. Therefore, the N-DLC layer 104A has better bonding with PFPE than normal (e.g., non-doped) DLC. However, N-DLC has a relatively low dielectric strength. The reduced dielectric strength is mainly due to C=N (sp2) and C≡N (sp) bonds in N-DLC. Therefore, the second DLC layer 104B is employed to compensate for the relatively low dielectric strength of the first DLC layer 104A. In some embodiments, the second DLC layer 104B beneath the N-DLC layer 104A is non-nitrogenated and may be a non-doped DLC (ND-DLC) layer, a hydrogenated DLC (H-DLC) layer or a fluorinated DLC (F-DLC) layer. The bottom DLC layer 104B may be thicker than the top DLC layer 104A, and one of its purposes is to increase the breakdown voltage. As indicated above, the bottom DLC layer 104B does not include nitrogen, and therefore can have higher dielectric strength. Consequently, a bottom DLC layer 104B using, for example, non-doped DLC, H-DLC or F-DLC can increase the dielectric strength of the whole PFPE-DLC structure.

In some embodiments, the N content in N-DLC layer 104A may be between about 5 atomic percent (atm. %) and about 20 atm. %. In an H- or F-DLC layer 104B, the H or F content may be between about 5 atm. % and about 30 atm. %.

FIG. 4 is a flow diagram of a method 300 in accordance with one embodiment. The method includes forming a substrate at 302. At 304, a dielectric layer including DLC is formed over the substrate. In some embodiments, the DLC layer may be formed by one of cathodic arc deposition, ion beam deposition or plasma enhanced chemical vapor deposition. As indicated earlier, these deposition techniques may achieve higher sp3 bonding than physical sputtering. In certain embodiments, multiple DLC layers having different compositions may be formed over the substrate. Also, in some embodiments, a lubricant layer (e.g., a PFPE layer) may be included over the substrate. At 306, a plurality of electrodes is connected to the dielectric layer. At 308, a voltage source that is selectively couplable to different electrodes of the plurality of electrodes is provided.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A digital microfluidic (DMF) system based on an electrowetting-on-dielectric mechanism, the DMF system comprising:
    a substrate;
    at least one dielectric layer comprising diamond-like carbon (DLC) over the substrate with at least a portion of the DLC comprising nitrogenated DLC;
    a plurality of electrodes connected to the dielectric layer; and
    a voltage source selectively couplable to different electrodes of the plurality of electrodes.

2. The DMF system of claim 1 and further comprising a hydrophobic layer comprising perfluoropolyether over the at least one dielectric layer.

3. The DMF system of claim 1 and wherein the at least one dielectric layer comprises a plurality of different DLC layers.

4. The DMF system of claim 3 and wherein each different DLC layer of the plurality of different DLC layers has a different dielectric strength.

5. The DMF system of claim 3 and wherein each different DLC layer of the plurality of different DLC layers has a different thickness.

6. The DMF system of claim 3 and wherein the plurality of different DLC layers comprises a nitrogenated DLC layer and a non-nitrogenated DLC layer below the nitrogenated DLC layer.

7. The DMF system of claim 6 and wherein the non-nitrogenated DLC layer comprises one of a non-doped DLC layer, a hydrogenated DLC layer or a fluorinated DLC layer.

8. A method comprising:
    forming a substrate;
    forming at least one dielectric layer comprising diamond-like carbon (DLC) over the substrate with at least a portion of the DLC comprising nitrogenated DLC;
    connecting a plurality of electrodes to the dielectric layer; and
    providing a voltage source that is selectively couplable to different electrodes of the plurality of electrodes.

9. The method of claim 8 and wherein forming the at least one dielectric layer comprising DLC comprises forming at least one DLC layer by one of cathodic arc deposition, ion beam deposition or plasm enhanced chemical vapor deposition.

10. The method of claim 9 and wherein forming the at least one DLC layer comprises forming a plurality of different DLC layers.

11. The method of claim 10 and wherein forming the plurality of different DLC layers comprises forming each different DLC layer of the plurality of different DLC layers with a different thickness.

12. The method of claim 10 and wherein forming the plurality of different DLC layers comprises forming a nitrogenated DLC layer and a non-nitrogenated DLC layer below the nitrogenated DLC layer.

13. The method of claim 12 and wherein forming the non-nitrogenated DLC layer comprises forming one of a non-doped DLC layer, a hydrogenated DLC layer or a fluorinated DLC layer.

14. A system comprising:

a substrate;

at least one dielectric layer comprising diamond-like carbon (DLC) over the substrate with at least a portion of the DLC comprising nitrogenated DLC;

a hydrophobic layer comprising perfluoropolyether with a hydroxyl group over the at least one dielectric layer;

a plurality of electrodes connected to the dielectric layer; and a voltage source selectively couplable to different electrodes of the plurality of electrodes.

15. The system of claim 14 and wherein the at least one dielectric layer comprises a plurality of different DLC layers.

16. The system of claim 15 and wherein each different DLC layer of the plurality of different DLC layers has a different dielectric strength.

17. The system of claim 15 and wherein each different DLC layer of the plurality of different DLC layers has a different thickness.

18. The system of claim 15 and wherein the plurality of different DLC layers comprises a nitrogenated DLC layer and a non-nitrogenated DLC layer below the nitrogenated DLC layer.

19. The system of claim 18 and wherein the non-nitrogenated DLC layer comprises one of a non-doped DLC layer, a hydrogenated DLC layer or a fluorinated DLC layer.

\*     \*     \*     \*     \*